US010472090B2

(12) United States Patent
Kessler et al.

(10) Patent No.: US 10,472,090 B2
(45) Date of Patent: Nov. 12, 2019

(54) ENVIRONMENTALLY AWARE STATUS LEDS FOR USE IN DRONES

(71) Applicant: QUALCOMM Incorporated, San Diego, CA (US)

(72) Inventors: Ross Eric Kessler, Philadelphia, PA (US); Jonathan Paul Davis, Philadelphia, PA (US); John Anthony Dougherty, Philadelphia, PA (US); Daniel Warren Mellinger, III, Philadelphia, CA (US); Charles Wheeler Sweet, III, San Diego, CA (US); Donald Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 15/498,980

(22) Filed: Apr. 27, 2017

(65) Prior Publication Data

US 2018/0312274 A1    Nov. 1, 2018

(51) Int. Cl.
*G05D 1/02* (2006.01)
*B64D 47/06* (2006.01)
(Continued)

(52) U.S. Cl.
CPC ............ *B64D 47/06* (2013.01); *B64C 39/024* (2013.01); *B64D 47/08* (2013.01); *G01S 19/14* (2013.01);
(Continued)

(58) Field of Classification Search
CPC .......... B64D 47/06; B64D 47/02; G05D 1/00; G05D 3/10; G05D 11/00; G05D 1/02;
(Continued)

(56) References Cited

U.S. PATENT DOCUMENTS 7,999,698 B2    8/2011   Annati et al.
8,543,249 B2 *  9/2013   Chemel .............. H05B 37/0272
                                                351/51
(Continued)

FOREIGN PATENT DOCUMENTS

CN    205060034 U       3/2016
CN    106527497 A  *    3/2017  ............... G05D 3/10
(Continued)

OTHER PUBLICATIONS

International Search Report and Written Opinion—PCT/US2018/018704—ISA/EPO—dated Apr. 18, 2018.

*Primary Examiner* — Yuri Kan
(74) *Attorney, Agent, or Firm* — The Marbury Law Group, PLLC

(57) ABSTRACT

A lighting system for an unmanned autonomous vehicle (UAV) adapts to the environment around the UAV to ensure status notification lights are visible to an operator and/or abide by regulatory lighting requirements. A processor of the UAV may receive information from various sensors regarding environmental conditions and location of the UAV, and adjust a UAV lighting system to ensure visibility under the environmental conditions. Adjustments to the lighting system may include selection of light sources that are illuminated, the illumination intensity of particular light sources, the colors emitted by various light sources and other lighting configurations.

30 Claims, 6 Drawing Sheets

(51) Int. Cl.
*B64D 47/02* (2006.01)
*B64C 39/02* (2006.01)
*G08G 5/00* (2006.01)
*G01S 19/14* (2010.01)
*B64D 47/08* (2006.01)

(52) U.S. Cl.
CPC ............ *G08G 5/006* (2013.01); *G08G 5/0091* (2013.01); *B64C 2201/146* (2013.01)

(58) Field of Classification Search
CPC .. G01C 21/20; G08G 5/00; B25J 9/16; H04N 7/18; G06K 9/40; G09G 5/10; B60Q 1/085
See application file for complete search history.

(56) References Cited

U.S. PATENT DOCUMENTS

| | | | |
|---|---|---|---|
| 8,890,411 | B2 | 11/2014 | Brown et al. |
| 9,588,516 | B1* | 3/2017 | Gurel .................. G05D 1/0033 |
| 2005/0169000 | A1* | 8/2005 | Hasegawa .............. B60Q 1/085 362/466 |
| 2009/0123086 | A1* | 5/2009 | Iwanami ................ H04N 5/147 382/274 |
| 2012/0218321 | A1* | 8/2012 | Ake ..................... G09G 3/3406 345/690 |
| 2013/0120330 | A1* | 5/2013 | Kang ....................... G09G 5/10 345/207 |
| 2014/0374535 | A1 | 12/2014 | Wong et al. |
| 2015/0254988 | A1 | 9/2015 | Wang et al. |
| 2015/0349882 | A1 | 12/2015 | Lamkin et al. |
| 2016/0059420 | A1* | 3/2016 | Ji ............................... B25J 5/00 348/148 |
| 2016/0150192 | A1* | 5/2016 | Cheatham, III ......... G06K 9/00 348/143 |
| 2016/0345408 | A1 | 11/2016 | Schoen et al. |
| 2017/0023945 | A1* | 1/2017 | Cavalcanti ........... G08G 1/0116 |
| 2017/0050747 | A1 | 2/2017 | Wessler et al. |
| 2017/0233099 | A1* | 8/2017 | Kuhara .................. B64D 47/02 701/3 |
| 2017/0278404 | A1* | 9/2017 | Gordon .................. G08G 5/006 |
| 2018/0068567 | A1* | 3/2018 | Gong .................... H04W 4/022 |
| 2018/0094935 | A1* | 4/2018 | O'Brien ................ G06Q 10/08 |

FOREIGN PATENT DOCUMENTS

| | | | |
|---|---|---|---|
| EP | 2130766 A2 * | 12/2009 | ............. B64D 47/06 |
| EP | 2130766 A2 | 12/2009 | |

* cited by examiner

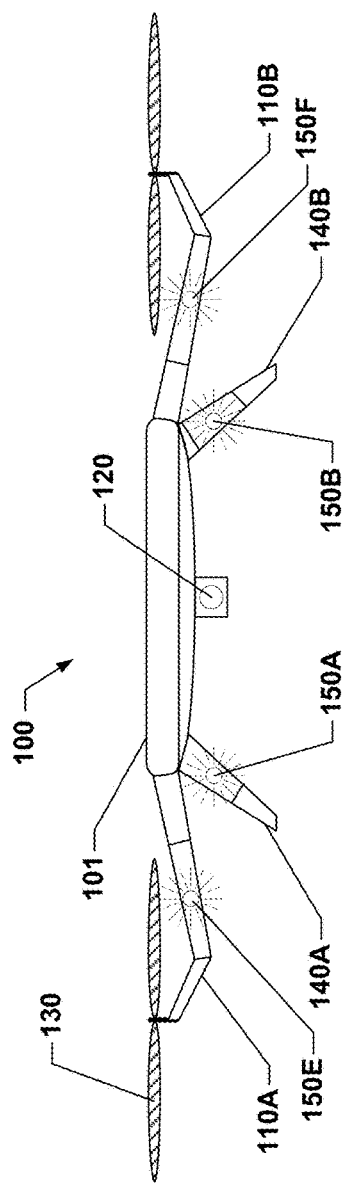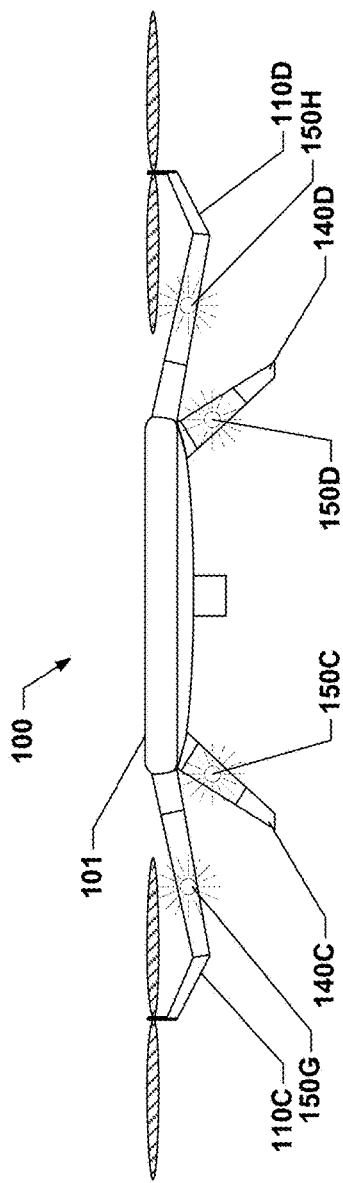

ENVIRONMENTALLY AWARE STATUS LEDS FOR USE IN DRONES

BACKGROUND

Unmanned vehicles are becoming widely used in personal or commercial applications. Unmanned vehicles can be remotely controlled, autonomous, or semi-autonomous. Examples of unmanned vehicles include airborne vehicles, terrestrial vehicles, space-based vehicles, or aquatic vehicles. Recently, the use of Unmanned autonomous vehicles (UAVs), also referred to as "drones," has increased. UAVs typically include a UAV lighting system which includes light source(s) such as light emitting diodes (LEDs) for indicating key information to operators (e.g., battery levels, errors, run mode, and other information).

SUMMARY

Various embodiments include methods and lighting systems for a UAV implementing such methods for automatically adjusting lighting system settings to manage visibility of light sources under various environmental conditions. Various embodiment may include a processor of the lighting system or the UAV obtaining information regarding an environment around the UAV, determining visibility of at least one light source on the UAV the information regarding the environment around the UAV, and adjusting the at least one light source on the UAV based on the determined visibility of at least one light source on the UAV. In some embodiments, obtaining information regarding an environment around the UAV may include obtaining information from sensors on the UAV. In some embodiments, obtaining information from sensors on the UAV may include obtaining information from at least one of a UAV camera, a global navigation satellite system (GNSS), an ambient light sensor, an altimeter, avionics, a barometer, a thermometer, a magnetometer, a microphone, an accelerometer, a gyroscope, humidity sensor, and a communication system. In some embodiments, the at least one light source may be configured to provide status information relating to the UAV.

In some embodiments, obtaining information regarding an environment around the UAV may include obtaining a location of the UAV, and determining visibility of the at the least one light source on the UAV based on the information regarding the environment around the UAV may include determining visibility of the at the least one light source on the UAV based on the location of the UAV.

In some embodiments, obtaining information regarding an environment around the UAV may include determining a separation distance between the UAV and an operator, and determining visibility of at least one light source on the UAV based on the information regarding the environment around the UAV may include determining visibility of the at least one light source on the UAV based on the determined separation distance between the UAV and the operator. Some embodiments may further include determining whether the UAV is within airspace for which a regulatory lighting requirement applies, and adjusting the lighting system of the UAV to comply with the regulatory lighting requirement in response to determining that the UAV is within airspace for which the regulatory lighting requirement applies.

In some embodiments, obtaining information regarding an environment around the UAV may include determining a current time or date information, and determining visibility of the at the least one light source on the UAV based on the information regarding the environment around the UAV may include determining visibility of the at the least one light source on the UAV based on the current time or date information.

In some embodiments, obtaining information regarding an environment around the UAV may include: determining whether the UAV is indoors or outdoors, and determining whether the UAV is operating during daylight hours or non-daylight hours, and determining visibility of the at least one light source on the UAV based on the information regarding the environment around the UAV may include determining visibility of the at the least one light source on the UAV based on whether the UAV is indoors or outdoors and operating during daylight hours. In such embodiments, adjusting the at least one light source on the UAV based on the determined visibility of the at least one light source on the UAV may include increasing brightness of the one light source on the UAV in response to determining that the UAV is outdoors and operating during daylight hours or non-daylight hours. In such embodiments, adjusting the at least one light source on the UAV based on the determined visibility of the at least one light source on the UAV may include decreasing brightness of the one light source on the UAV in response to determining that the UAV is indoors regardless of whether the UAV is operating during daylight hours.

Some embodiments may further include determining an orientation of the UAV with respect to an operator, in which adjusting the at least one light source on the UAV based on the determined visibility of the at least one light source on the UAV may include adjusting the at least one light source on the UAV based on the determined orientation of the UAV with respect to the operator. In such embodiments, adjusting the at least one light source on the UAV based on the determined orientation of the UAV with respect to the operator may include illuminating one or more light sources facing the operator. In such embodiments, adjusting the at least one light source on the UAV based on the determined orientation of the UAV with respect to the operator may include turning off one or more light sources facing away from the operator.

In some embodiments, adjusting the at least one light source on the UAV may include selecting a light setting from among a plurality of predetermined lighting settings. In some embodiments, adjusting the at least one light source on the UAV may include adjusting one or more of intensity of light, light color, light pattern, and light flashing frequency.

Various embodiments further include a lighting system for a UAV including at least one light source and a processor coupled to the light source and configured to perform operations of the methods summarized above. Various embodiments further include a lighting system for a UAV including means for performing functions of the methods summarized above. Various embodiments further include a non-transitory, processor-readable medium having stored thereon processor-executable instructions configured to cause a processor of a lighting system for a UAV to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 1A is a front view of a UAV including a lighting system of the UAV according to various embodiments.

FIG. 1B is a back view of the UAV including a lighting system of the UAV of FIG. 1A according to various embodiments.

DETAILED DESCRIPTION

Figure 2:
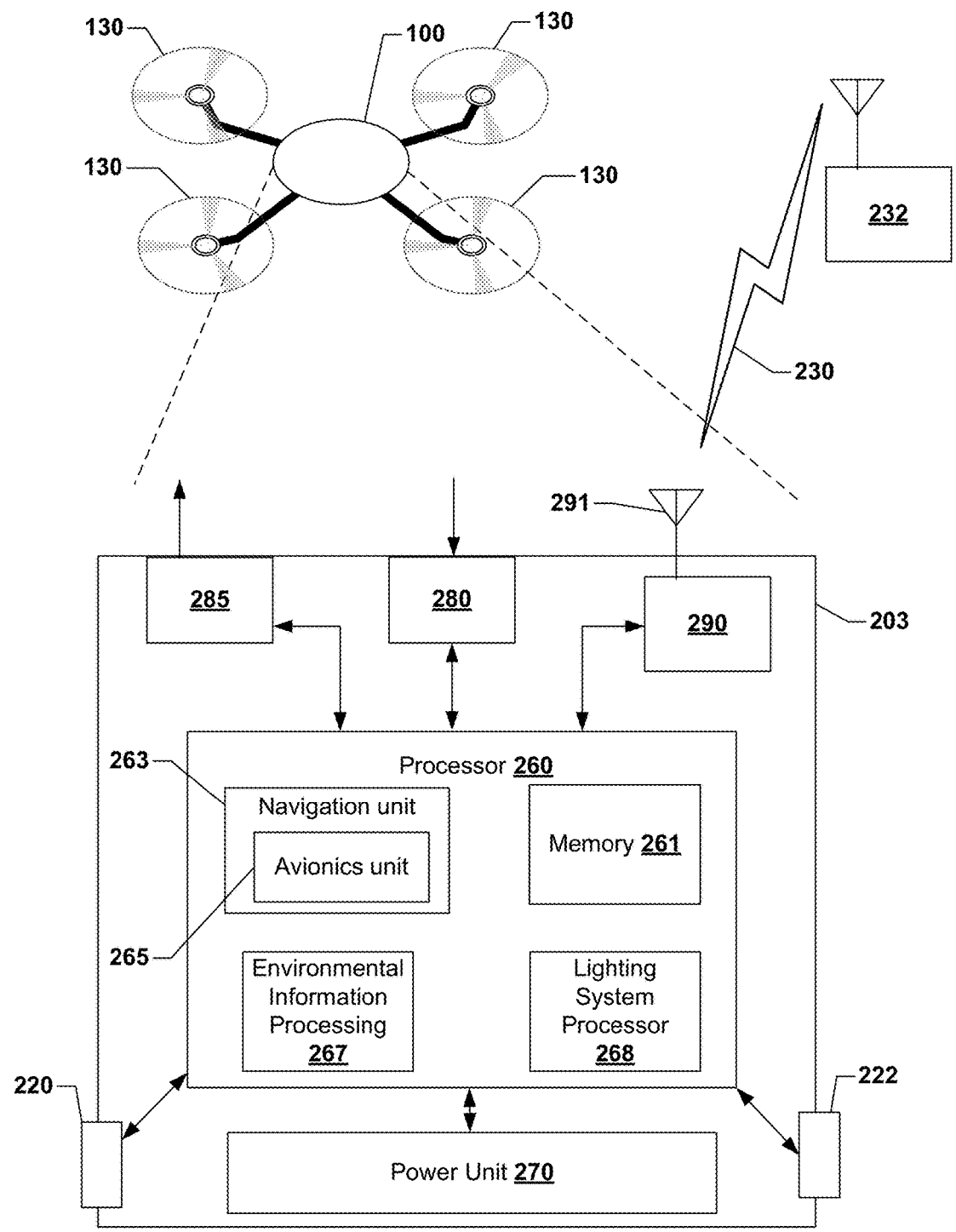
FIG. 2 is a component diagram of a control unit of a UAV suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a UAV lighting system that includes at least a UAV and various light sources mounted to or in the UAV. The UAV lighting system may illuminate lights in particular colors and/or patterns to provide an operator with information regarding critical and non-critical information regarding the UAV. The visibility of such lights to an observer can be impacted by the environment of the UAV, as well as the distance to the operator and the UAV's orientation. In various embodiments, the UAV may include sensors configured to sense environmental conditions, and a processor configured to adjust a lighting configuration based on environmental conditions to enable operators and/or others to see the indications. In some embodiments, the UAV lighting system may be adjusted based on the distance between the UAV and the operator. In some embodiments, the UAV lighting system may be adjusted to illuminate particular lights while dimming others based on the orientation of the UAV with respect to the operator. For example, the UAV lighting system may adapt to environmental conditions by increasing/reducing the intensity of light, changing light color, changing light patterns, changing the lights that are illuminated, and/or changing a flashing frequency of the light sources.

As used herein, the term "UAV" refers to one of various types of unmanned autonomous vehicles. Examples of UAV suitable for use with the various embodiments include unmanned aerial vehicles or "drones," unmanned land vehicles (e.g., autonomous vehicles), and unmanned autonomous watercraft.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include UAV controllers, wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities for communicating with a UAV.

FIGS. 1A-1B illustrate front and back views of an example of a UAV 100 with a UAV lighting system suitable for use with various embodiments. In the illustrated examples, a UAV 100 may include a body 101, flight arms 110A-D coupled to the body, sensors 220, rotors 130, landing legs 140A-D, and light sources 150A-H. In some embodiments, the size, shape, and orientation of the body 101, as well as, the mounting positions and number of flight arms 110A-D, rotors 130, and landing legs 140A-D may differ from the examples illustrated in the figures. In UAV designs, the body 101, flight arms 110A-D, rotors 130, and/or landing legs 140A-D may obstruct views of some of the light sources 150A-H from various perspectives.

In various embodiments, the UAV lighting system may include the light sources 150A-H, as well as at least one processor configured to activate particular lights and control the intensity, emitted color, and/or flashing duration and frequency. The light sources 150A-H may be positioned and configured to communicate to operators or nearby persons various information regarding the status, location, orientation, and/or condition of the UAV 100. Such information may be communicated by illuminating particular lights and via various light output adjustments of the illuminated lights, such as light intensity, light color, flashing frequency, light patterns, etc.

The light sources 150A-G may be any of a variety of lights, such as light emitting diodes (LEDs), compact fluorescent lamps (CFL), incandescent lights, halogen lights, fluorescent lights, xenon lights, and the like. The light sources 150A-G may have different capabilities regarding light intensity, light color, flashing frequency, etc. which may affect the manner and degree to which the lights may be adjusted. For example, LEDs may be limited to certain colors or may be limited in light intensities.

In various embodiments, the light sources 150A-H may be fixed in or mounted to the UAV 100 in a variety of locations, such as on the landing legs 140A-D (e.g., the light sources 150A-D) and flight arms 110A-D (e.g., the light sources 150E-H)). In some embodiments, the light sources 150A-H may be fixed in or mounted to other locations of the UAV 100, such as, other parts of body 101 or the rotors 130. For example, LEDs mounted to the rotors may display messages or images during actuation of the rotors. The light sources 150A-H may also be fixed in or mounted to the landing legs 140A-D and flight arms 110A-D oriented multi-directionally. For example, some light sources 150A-H may be configured to illuminate external sections of the arms and legs of the UAV 100. The light sources 150A-H may be fixed in or mounted to the UAV 100 by bolting, riveting, gluing, or otherwise affixing the light sources 150A-H to the UAV 100.

In some embodiments, the light sources 150A-H may be oriented mono-directionally or bi-directionally such that the lights may be visible or invisible from different viewing perspectives. For example, if some light sources (e.g., 150A-B) are mono-directional and mounted facing toward the front of the UAV 100, then persons with a side or back view of the UAV 100 will not be able to see the light notifications presented by those light sources 150A-B.

FIG. 2 illustrates components of an example UAV 100 suitable for use with various embodiments. With reference to FIGS. 1A-2, the illustrated UAV 100 is a "quadcopter" having four horizontally configured rotary lift propellers, or rotors 130 and motors fixed to a body 101. The body 101 may support a control unit 203, landing legs (or skids) and the propulsion motors, power source (power unit 270) (e.g., battery), and other components. The rotors 130 may be driven by corresponding motors to provide lift-off (or take-off) as well as other aerial movements (e.g., forward progression, ascension, descending, lateral movements, tilting, rotating, etc.).

A UAV may be propelled for flight in any of a number of known ways. For example, a plurality of propulsion units, each including one or more rotors, may provide propulsion or lifting forces for the UAV. In addition, the UAV may include wheels, tank-treads, or other non-aerial movement mechanisms to enable movement on the ground, on or in water, and combinations thereof. The UAV may be powered by one or more types of power source, such as electrical, chemical, electro-chemical, or other power reserve, which may power the propulsion units, the onboard computing device, and/or other onboard components.

A UAV 100 may include a control unit 203 configured to control flight and other operations of the vehicle. The control unit 203 may include a processor 260, a power unit 270, an input module 280, an output module 285, and one or more communication resources 290 coupled to an antenna 291. The processor 260 may be coupled to a memory unit 261, a navigation unit 263, and an environmental information processor 267. The processor 260 may be configured with processor-executable instructions to control flight and other operations of the UAV 100, including operations of various embodiments. The processor 260 may be powered from the power unit 270, such as a battery.

The control unit 203 may include one or more communication resources 290, which may be coupled to an antenna 291 and include one or more transceivers. The transceiver(s) may include any of modulators, de-modulators, encoders, decoders, encryption modules, decryption modules, amplifiers, and filters. The communication resource(s) 290 may be capable of wireless communications 230 with a UAV controller 232 used by an operator, device-to-device communication with other UAVs, wireless communication devices carried by a user (e.g., a smartphone), ground stations such as mobile telephony network base stations, and other devices or electronic systems.

The processor 260 may be coupled to a motor system that is configured to manage the motors that drive the rotors 130. For example, the processor 260 may independently control the power applied to each of the motors to adjust the rotation speeds of each rotor 130 in order to control the UAV's flight.

The UAV power unit 270 may include one or more energy storage components, such as rechargeable batteries, that may provide power to various components, including the processor 260, the input module 280, the sensors 220, the output module 285, and the communication resource(s) 290.

The processor 260 may be coupled to a navigation unit 263, which may collect position, acceleration, rotation and orientation data from a variety of sensors 220. In various embodiments, the sensors 220 may include, for example, a global navigation satellite system (GNSS) (e.g., global positioning system (GPS) for retrieving location and time information), accelerometers (e.g., for sensing motion of the UAV), gyroscopes (e.g., for sensing rotations of the UAV), a magnetometer (providing direction sensing), a barometer, and the like that are configured provide the processor 260 with information regarding the present position, direction of travel and orientation of the UAV 100.

In various embodiments, a variety of sensors 220 may be attached to or included on the UAV 100, and configured to sense characteristics about the environment surrounding the UAV that may affect visibility of the light sources 150A-H. The various sensors 220 may be located on or within the UAV 100 in various locations and may be connected, wired or wirelessly, to environmental information processing unit 267, which may be configured to analyze data from the sensors 220 to determine the effects of environmental conditions on visibility of various light sources. In addition to the sensors 220 useful for attitude control and navigation (e.g., GPS, accelerometers, gyroscopes, magnetometers and barometers), the sensor 220 may include, for example, a camera 222, a thermometer, optical sensors (e.g., ambient light sensors), audio sensors, and a humidity sensor. Additionally, the one or more communication resources 290 may be configured to receive information regarding current weather conditions, times of sunrise/sunset, and the like, and pass such information to the environmental information processing unit 267.

The environmental information processing system 267 may be a separate processor, such as an application specific integrated circuit (ASIC) or DSP, configured for object and environmental context identification (e.g. ambient light, weather conditions, etc.). Alternatively, the environmental information processing system 267 may be implemented in software executing within the processor 260 or within a lighting system processor 268.

A camera 222 may be used to function as an environmental sensor by measuring the ambient light and determining the degree to which smoke, rain or fog is present in the environment. For example, images from a camera 222 may be used by environmental information processing system 267 to determine weather conditions affecting visibility (e.g., rain, snow, hail, fog, smoke, etc.) by analyzing images to determine whether objects at a known distance can be seen or recognized, and/or detecting small objects (e.g., rain snow or hail) in the foreground. As another example, a camera 222 image may be processed to determine whether an operator of the UAV can be recognized and the relative size of the operator within the image, which may provide information directly relatable to the visibility of the UAV light sources to the operator. In other words, if the camera 222 on the UAV is unable or barely able to image the operator, then the operator will have a difficult time seeing the UAV. The camera 222 may include sub-components other than image or video capturing sensors, including auto-focusing circuitry, International Organization for Standardization (ISO) adjustment circuitry, and shutter speed adjustment circuitry, which may also provide data useful in estimating the visibility of the UAV light sources to the operator.

The environmental information processing system 267 may use the information received from a combination of the sensors 220 to determine the environmental context (e.g., ambient light, time of day and surrounding weather conditions) of the UAV 100. Additionally, the navigation unit 263 and avionics component 265 may use the information received from some of the sensors 220 to determine the present position and orientation of the UAV 100 with respect to the operator.

The communication resource(s) 290 may be configured to receive commands for controlling the UAV 100, or components thereof from the operators wireless control unit 232. The control unit 232 may provide requirements for particular UAV maneuvers or missions, inputs from a knowledge base regarding current conditions, a current orientation of the UAV 100 vis a vi the operator, predicted future conditions, aiming parameters of the camera 222, the location of the control unit 232 (and thus the operator), and/or information regarding environmental conditions. For example, the operator may input into the control unit 232 (e.g., button presses) observations regarding the visibility of the UAV light sources 150A-H, which the communication system 290 may provide to the lighting system processor 268.

While the various components of the control unit 203 are illustrated in FIG. 2 as separate components, some or all of the components (e.g., the processor 260, the output module 285, the communication resource(s) 290, and other units) may be integrated together in a single device or module, such as a system-on-chip module. Further, the UAV 100 illustrated in FIGS. 1A-2 is merely an example of a UAV that may utilize various embodiments, but is not intended to imply or require that various embodiments are limited to rotorcraft UAVs. Various embodiments may be used with winged UAVs as well. Further, various embodiments may equally be useful with land-based autonomous vehicles, and water-borne autonomous vehicles.

Figure 3:
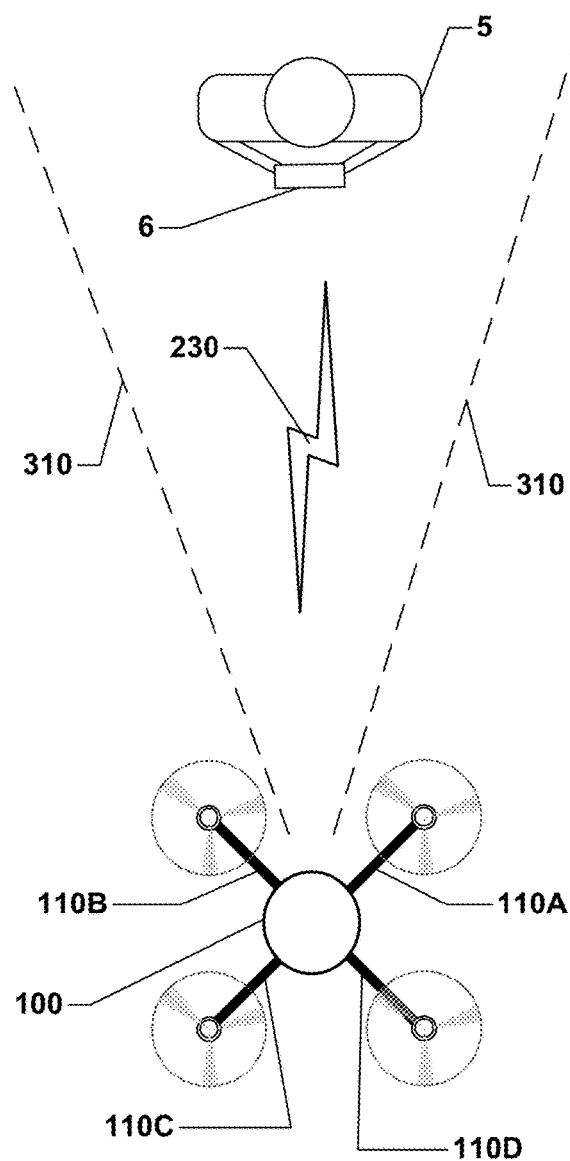
FIG. 3 is a top schematic view of the UAV including a lighting system of FIG. 1A in relation to an operator according to various embodiments.

FIG. 3 is a top schematic view of the UAV 100 including a UAV lighting system in relation to an operator. With reference to FIGS. 1-3, the orientation of the UAV 100 is illustrated with the field-of-view 310 of the camera 222 facing the operator 5. In this orientation, the images retrieved from the camera 222, as well as data from other sensors 220, may be used by a processor (e.g., the UAV processor 260, the environmental information processor 267, and/or the lighting system processor 268) to determine the distance to the operator 5. For example, the size of the operator 5 within a camera image may be used to estimate the distance to the operator 5. Additionally, the strength of wireless signals received from the control unit 232, and/or GNSS coordinates of the control unit 232 and the UAV 100 may also be used to determine or estimate the distance between the operator 5 and UAV 100.

When the operator 5 is within the field of view 310 of the camera 222, images of the operator may be processed to determine or estimate the impact on the operator's visibility of UAV light sources due to particles, moisture, haze, smog, smoke, etc. in the air between the operator 5 and the UAV 100. For example, a processor (e.g., the UAV processor 260, the environmental information processor 267, and/or the lighting system processor 268) may analyze the pixels containing the image of the operator 5 to assess the clarity or crispness of the operator's image. This determination may take into account the distance between the operator 5 and UAV 100, and may compare the determined clarity or crispness of the operator's image to an expected level of clarity or crispness at the separation distance to estimate a visibility impairment factor due to the surrounding air conditions.

Figure 4:
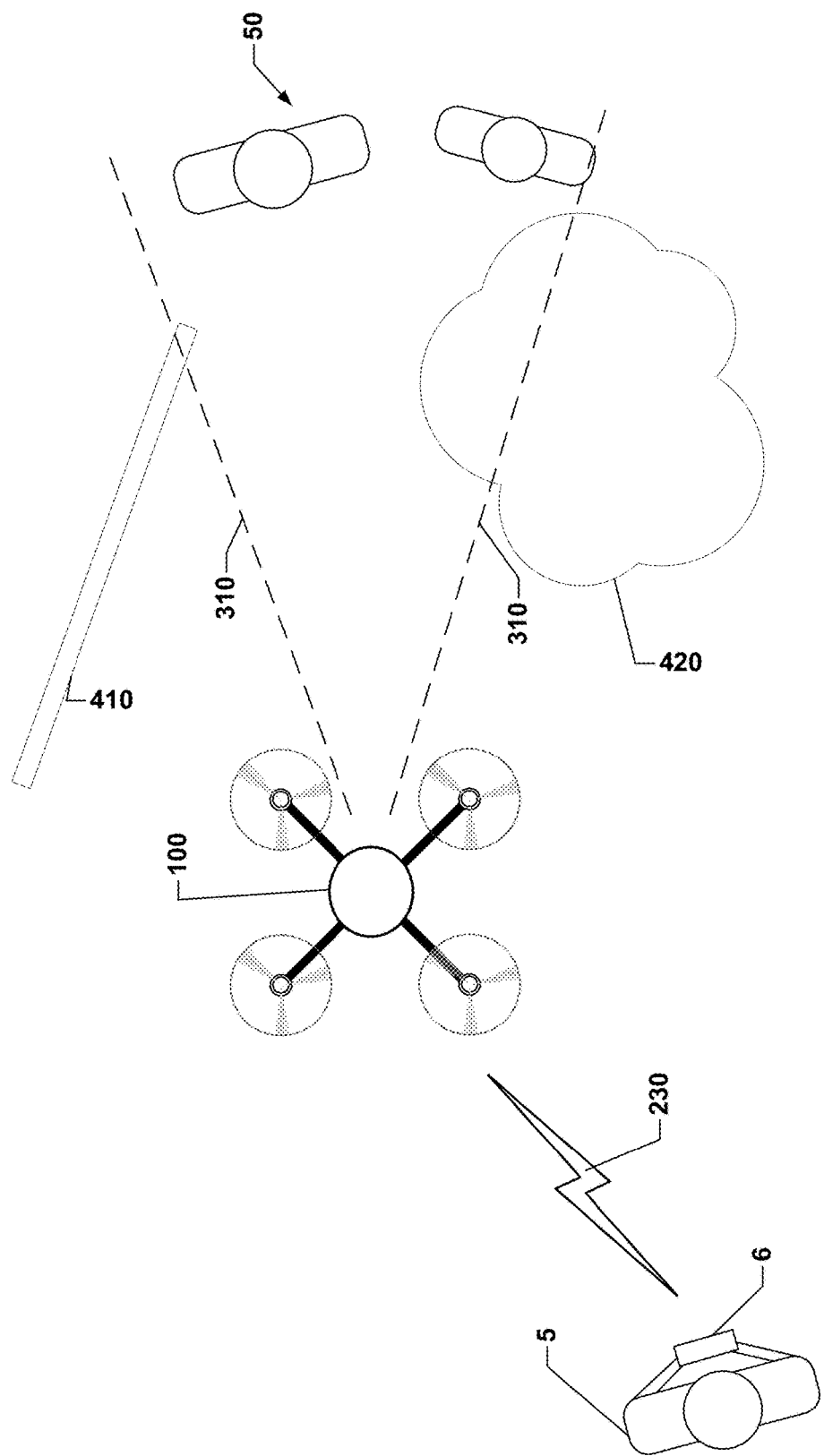
FIG. 4 is a top schematic view of an UAV including a lighting system illustrating visibility of light sources by nearby persons according to various embodiments.

In addition to environmental conditions, objects near the UAV 100 or observers (e.g., the operator) may also impact the visibility of various UAV light sources 150A-H. FIG. 4 is top schematic view illustrating the UAV 100 in relation to an operator 5, nearby persons 50, and objects (e.g., a wall 410 and a tree 420). With reference to FIGS. 1-4, the UAV is illustrated with the camera 222 field-of-view 310 facing the nearby persons 50 but away from the operator 5. In the illustrated example, one of nearby persons 50 has a direct line of sight to the UAV 100 but the other nearby person's 50 vision of UAV 100 is impeded by a tree 420. In some embodiments, an image may be processed by a processor (e.g., the UAV processor 260, the environmental information processor 267, and/or the lighting system processor 268) to determine whether there are objects between the UAV 100 and observers (e.g., 50) that impact visibility of the UAV light sources 150A-H, enabling the UAV lighting system to adjust lighting settings to account for the intervening object. For example, the UAV lighting system may increase the brightness or color of the light sources 150A, 150E to increase visibility of the UAV light sources 150A-H by nearby persons 50 through the leaves and branches of the tree 420.

Also illustrated in FIG. 4 is a wall 410 that is positioned so that a surface of the wall 410 may reflect the light output from light sources 150A-H, thus affecting the visibility of the UAV light sources. In some embodiments, an image of the wall 410 may be processed by a processor (e.g., the UAV processor 260, the environmental information processor 267, and/or the lighting system processor 268) to determine the reflectance or other impact of the wall 410 on visibility of particular light sources (e.g., 150A and 150E).

The lighting system processor 268 may use the data received from the various sensors 220, cameras 222 and other sources of environmental data (e.g., reports received via wireless communications), separately or in various combinations, to estimate how the environment around the UAV 100 is likely to affect the visibility of the lighting sources 150A-H. The lighting system processor 268 may be configured to change individual lights that are illuminated and/or configure the various light sources 150A-H based at least in part upon the estimated impact on visibility of the environment. For example, the lighting system processor 268 may increase or decrease the light intensity of particular light sources 150A-H, change light colors, change the light sources that are illuminated, change lighting patterns, and/or change flashing frequency of the light source(s) to make the UAV 100 more visible or less distracting depending upon the observed environment surrounding the UAV.

The lighting system processor 268 may adjust the light intensity and configuration of various light sources 150A-H to accommodate the estimated impact of the environment surrounding the UAV 100 on visibility of UAV light sources by the operator. For example, if the ambient light is bright (e.g., the UAV 100 is operating outside on a sunny day), the lighting system processor 268 may increase the intensity of various light sources so that the lights remain visible to the operator against the bright sky. As another example, if the UAV 100 is operating in dim or dark conditions, the lighting system processor 268 may decrease the intensity of various light sources to maintain consistent visibility against the dark background. As a further example, if the lighting system processor 268 determines that the volume of air between the UAV 100 and the operator is filled with smog, haze, rain, fog or smoke (for example), the lighting system processor 268 may increase the intensity of the light sources 150A-H to compensate for the intervening materials. The degree to which the lighting system processor 268 adjusts light intensity based on the environment may also take into account the distance separating the UAV 100 from the operator 5. Thus, the greater the separation distance and the more the environment impacts the visibility of the light sources 150A-H by the operator 5, the more of the lighting system processor 268 may increase the light intensity to maintain visibility of the light sources by the operator 5.

The lighting system processor 268 may also consider the orientation of the UAV 100 with respect to the operator in selecting the particular light sources that are activated. For example, light sources facing away from the operator may not be illuminated while the light sources that are visible to the operator are illuminated.

In addition to environmental factors, the adjustments made to the UAV lighting system by the lighting system processor 268 may depend upon the operating location and the purpose of particular light sources 150A-H. For example, if the UAV 100 is being operated indoors (i.e., in a climate controlled and/or protected environment), the lighting system processor 268 may adjust the intensity of various light sources based primarily on measured ambient light levels, and possibly based on the separation distance from the operator. For example, if the UAV is operating indoors in a well illuminated volume, the intensity of the light sources 150A-H may be increased so that the operator can see the lights. As another example, if the UAV is operating indoors in a dim or dark building, the intensity of the light sources 150A-H may be decreased so that the operator's vision of the UAV is not overwhelmed by the light and/or the operator's night vision is not compromised. Considerations of indoor navigation may include distance (e.g., further distance requires higher light output) and orientation from the operator, objects impeding operator vision of UAV 100 (e.g., if an operator 5 is down a hall from the UAV 100, light output for notifying the operator may include light intensity level, illumination of particular light sources, light patterning, light flashing frequency and/or light color), and light reflection capabilities of objects in the environment. Other considerations may also include volume determination of the indoor space to consider light diffusion since too much light output could become distracting and reduce effectiveness of the light notification within a confined space.

Different considerations may be taken into account in adjusting the UAV lighting system when the UAV 100 is operating outdoors. The location, altitude, and attitude may be used in consideration with the other information such as weather effects (e.g., fog, rain, snow, etc.), time of day, object interference (e.g., smoke and other objects within the environment), as well as any outdoor considerations, and various combinations of this information (e.g., location and time of day may be used to establish sunrise, sunset, and sun location). For example, if the UAV 100 is operating outdoors where navigation lights are required by government regulations (e.g., within airspace shared with manned or other unmanned aircraft), navigation lights may be set in accordance with required locations, colors, flashing frequency, etc. at the designated minimum illumination levels under the environmental conditions, while status lights are adjusted based on the environment to ensure they are visible to the operator 5 based on distance and the environmental conditions.

In addition to light intensity, the lighting system processor 268 may adjust the admitted color or select particular colored lights to illuminate based on the measured environmental conditions. For example, in low light conditions, the lighting system processor 268 may avoid using red lights or significantly increase the intensity of any red lights when operating in a dim environment due to the fact that red light is less visible in low light conditions. As another example, when background conditions are white or light colored (e.g., clouds), the lighting system processor 268 may activate blue or green lights (versus white lights) in order to provide greater contrast.

In various embodiments, the light system processor 268 may adjust each light sources 150A-H differently based on environmental awareness, as well as, UAV information (e.g., size, shape, positioning, etc. of components of the UAV 100), and navigation and orientation of the UAV 100. For example, the light system processor 268 may determine that visibility by the operator 5 of certain light sources 150A-H is blocked by components of the UAV 100, and in response, increase light output or change the illuminated light sources 150A-H. In some embodiments, the light system processor 268 may determine the orientation of the UAV 100 with respect to the operator 5 and other nearby persons (e.g., 50), and adjust the light sources 150A-H accordingly to assure visibility of the UAV light sources 150A-H and the communication of the information indicated by the illuminated light sources 150A-H. For example, the light sources 150A and 150D facing the operator 5 (e.g., to the right of the UAV 100) may be illuminated by the light system processor 268 to provide status notifications of UAV 100 (such as a patterned or colored light output) whereas, light sources (e.g., 150B) visible from other directions may be illuminated by the light system processor 268 to provide a solid visible light output to enable the UAV 100 to be seen by others. The light system processor 268 may control the light output for each of light sources 150A, 150B, and 150D independently based on the distance to the operators and nearby persons (e.g., higher output when further and lower output when closer). The distance to the operator 5 may be determined by the light system processor 268 based upon GNSS, using communication signal strengths (e.g., signal strength between the UAV 100 and wireless control unit), image analysis, or through other methods using the other sensors 220 (e.g., microphone establishing distance by the voice or through echo-location of the operator and nearby persons). The distance to the nearby persons may be determined by the light system processor 268 through image analysis of images of the nearby persons captured by the camera 222.

In some embodiments, the light system processor 268 may take into account the viewing perspective of the operator 5 of the UAV 100 with respect to the sun or other light sources. For example, if the light system processor 268 determines that the UAV 100 is operating near dawn or dusk when the sun's elevation is low and thus may impact visibility of the UAV 100 in some directions, the processor 268 may determine whether the operator 5 is viewing the UAV 100 in the direction of the sun, and adjust the light intensity of some UAV light sources 150A-H accordingly. In some embodiments, the light system processor 268 may use knowledge of the cardinal direction of the UAV to the operator (or vice versa) to determine whether increased light output is necessary. For example, the light system processor 268 may determine that sunlight may not impede visibility of the light sources 150A-H if the operator is facing the UAV 100 to the East, such that no light source adjustment is needed. Similarly, the light system processor 268 may determine that sunlight may impede visibility of the light sources 150A-H if the operator is facing the UAV 100 to the West, and increase light output accordingly.

Figure 5:
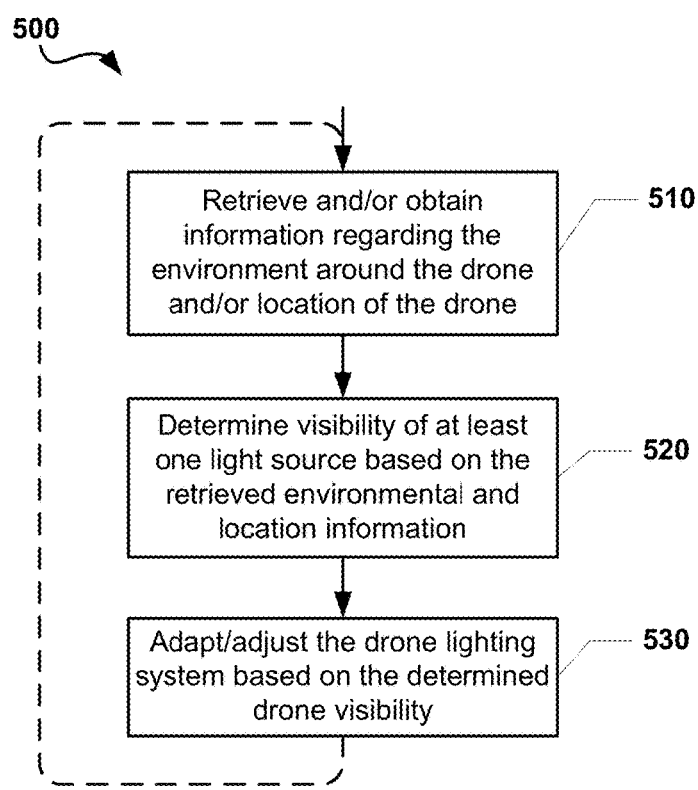
FIG. 5 is a process flow diagram illustrating a method of adjusting a UAV lighting system in response to sensed environment conditions according to various embodiments.

FIG. 5 illustrates a method 500 of adjusting a UAV lighting system of a UAV to information regarding the surrounding environment according to various embodiments. With reference to FIGS. 1-5, operations of the method 500 may be performed by a processor (e.g., the lighting system processor 268 or UAV processor 260) of a UAV (e.g., 100) or another computing device (e.g., wireless control unit) in communication with the UAV.

In block 510, the processor may obtain information from sensors 220 of the UAV and process the information to determine information regarding the environment around the UAV 100. The information may include camera images and data regarding ambient light, weather conditions, nearby objects, etc. The processor may perform these determinations based on information from another source (e.g., a knowledge base (e.g., in an onboard and/or remote database), or systems controlling the operation of the UAV 100).

In block 520, the processor may determine the visibility of at least one lights source on the UAV based on the information regarding the environment around the UAV 100. Knowledge databases regarding light sources and other component locations on the UAV, as well as UAV types and/or dimensions that may affect visibility of one or more light sources in the UAV lighting system may be used by the processor to determine the light source(s) that should be adjusted to increase visibility. For example, the processor may use the orientation of the UAV 100 to determine the light sources that are visible to the operator and others. In some embodiments, the processor may not adjust light sources that the processor determines are not visible to the operator.

In block 530, the processor may adjust the light source(s) of the UAV lighting system based on the determined light source visibility to achieve a particular level of visibility. In various embodiments, the adjustments may include changing light intensity, the light sources that are illuminated, light patterns, light flashing frequency, and light color. The processor may utilize knowledge databases of the capabilities of the light sources in the UAV lighting system in determining the adjustments made to the light source(s).

In some embodiments, the processor may adjust the light source(s) of the UAV lighting system based on predetermined configurations depending on the various environmental factors. For example, predetermined settings for the UAV lighting system may be correlated to certain ambient light levels and other the environment conditions, and the processor may use measurements of ambient light levels and other the environment conditions to select an appropriate predetermined setting for the UAV lighting system, such as an established light intensity level that is most visible in that particular ambient light level. In some embodiments, the processor may adjust the light source(s) based on a user input. For example, the processor may adjust the output the light source(s) at a slow rate so the operator can observe the UAV lights. Upon seeing a light setting that the operator considers ideal, operator may signal the processor of this, and the processor may leave the light setting at the configuration and settings selected by the operator. In some embodiments, the operator may select a particular lighting configuration from among a set of light settings that may be presented to the operator in various ways, and a control unit may signal the user's selection to the UAV.

Figure 6:
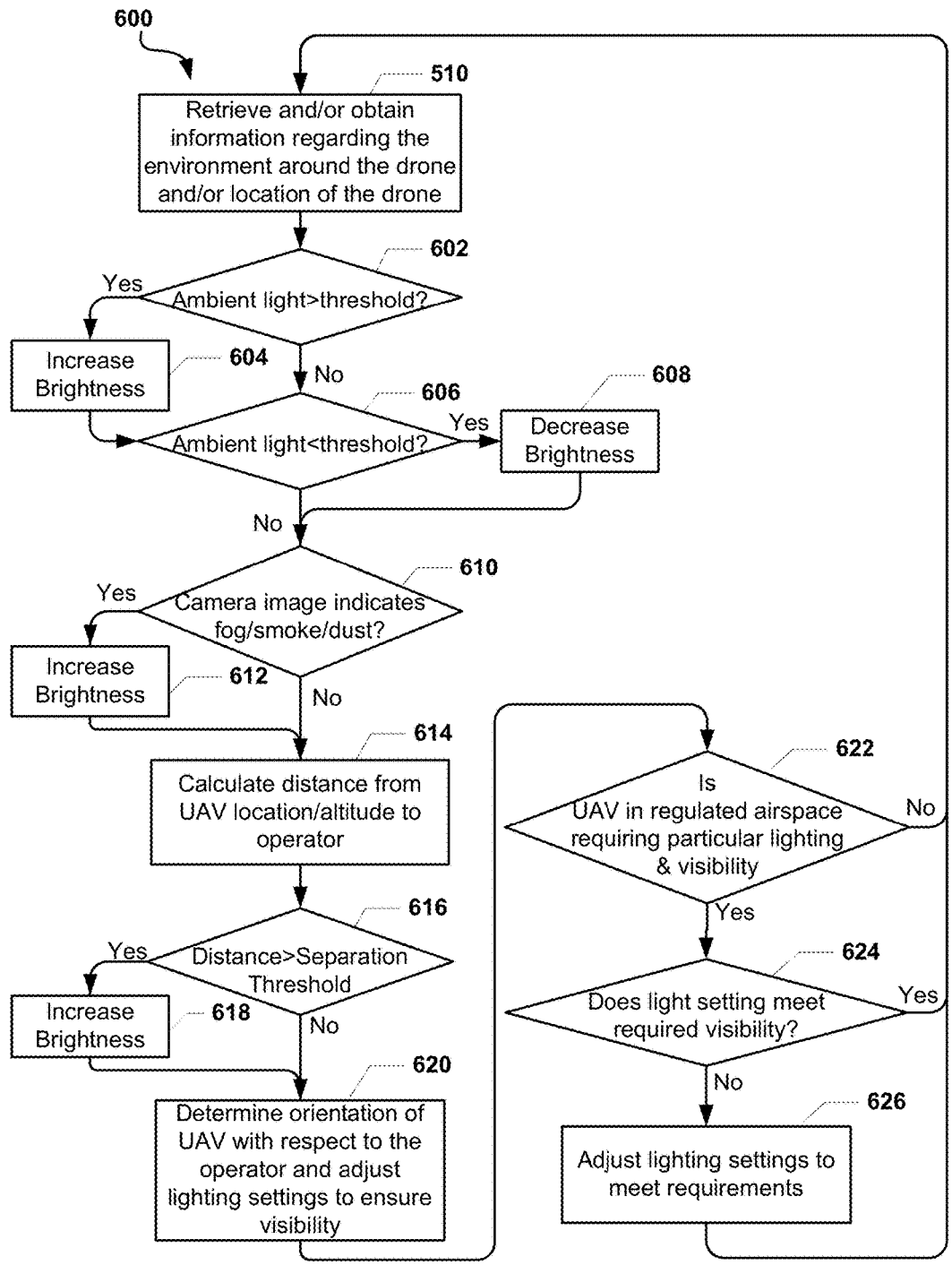
FIG. 6 is a process flow diagram illustrating a method of adjusting a UAV lighting system based on sensed environmental conditions according to various embodiments.

FIG. 6 illustrates a method 600 of adjusting a lighting system of a UAV to information specific environmental conditions around the UAV 100 according to various embodiments. With reference to FIGS. 1-6, the operations of the method 600 may be performed by a processor (e.g., the lighting system processor 268 or UAV processor 260) of a UAV (e.g., 100) or another computing device (e.g., wireless control unit) in communication with the UAV.

In block 510, the processor may obtain information from sensors 220 which may be processed to determine information regarding the environment around the UAV 100. The information may include data describing ambient light, weather conditions, nearby objects, etc. as described.

In determination block 602, the processor may determine whether the ambient light of the environment around the UAV exceeds a first threshold ambient light level. In some embodiments, the processor may compare a light sensor or camera setting to a pre-defined threshold of brightness above which the intensity of one or more light sources should be increased to ensure visibility by an operator. Such a first threshold may be determined through experimentation and/or user inputs, including user inputs received during the current flight.

In response to determining that the ambient light exceeds the first threshold ambient light level (i.e., determination block 602="Yes")), the processor may increase the light intensity level of one or more light sources of the UAV lighting system in block 604. Increasing the light intensity level may make the UAV more visible in bright environments, such as in direct sunlight. The amount by which the light intensity is increased in block 604 may depend upon the magnitude of the difference between the measured/sensed ambient light and the first threshold ambient light level.

In response to determining that the ambient light does not exceed the first threshold ambient light level (i.e., determination block 602="No"), the processor may determine whether the ambient light is less than a second threshold in determination block 606. In some embodiments, the processor may compare a light sensor or camera setting to a pre-defined threshold of brightness below which the intensity of light sources should be decreased or otherwise adjusted (e.g., changed to red light) to provide comfortable visibility by an operator. For example, in dim conditions, the processor may dim some of the light sources on the UAV so that those light sources do not outshine other lights on the UAV, such as status lights or navigation lights. Such a second threshold may also be determined through experimentation and/or user inputs.

In response to determining that the ambient light is less than the second threshold ambient light level (i.e., determination block 606="Yes"), the processor may decrease the light intensity level of (or otherwise adjust) one or more light sources of the UAV lighting system in block 608. Decreasing the light intensity level while operating in dim or dark conditions may avoid compromising the operator's night vision and/or overwhelming other lights on the UAV. Decreasing the light intensity level while operating in dim or dark conditions may also save power, thereby extending the flight time of battery powered UAVs. Additionally or alternatively, the emitted color of some lights on the UAV may be changed in block 608, such as switching some lights to red to reduce or minimize the degree to which the operator's night vision is compromised by the UAV lighting system. The amount by which the light intensity is decrease and/or changes in color commanded by the processor in block 606 may depend upon the magnitude of the difference between the measured/sensed ambient light and the second threshold ambient light level.

In response to determining that the ambient light is not less than the second threshold ambient light level (i.e., determination block 606="No"), or after adjusting light intensity level(s) in either blocks 604 or 608, the processor may process one or more camera images to determine whether the images indicate a light diffusing environment, such as haze, fog, smog, smoke, or dust, in determination block 610. This determination may include comparing a level of crispness or details in an image of the operator or another object at a known distance, imaging particles of rain or snow in the foreground, and/or recognizing when distant objects are not visible or difficult to recognize due something in the air that is diffusing light.

In response to determining that the image indicates a light diffusing environment (i.e., determination block 610="Yes"), the processor may increase the brightness or intensity level of (or otherwise adjust) one or more light sources of the UAV lighting system in block 612.

In response to determining that the image does not indicate a light diffusing environment (i.e., determination block 610="No") or after increasing brightness or intensity level of light sources, the processor may calculate the distance from the UAV to the operator in block 614. This determination may be based upon a number of sources of information and sensors. For example, the UAV processor may obtain the location coordinates and altitude of the UAV from a GNSS receiver and receive the operator's location coordinates from the user's control module, and determine the distance based upon this information. As another example, the UAV processor may identify the user within a camera image and estimate the separation distance based on the apparent size of the operator knowing the operator's actual height. As a further example, the processor may estimate the distance between the UAV and the operator based on a signal strength of wireless signals received from a control unit held by the operator. Various distance estimating methods may be used in combination in order to more accurately calculate the separation distance.

In block 616, the processor may determine whether the distance between the UAV and the operator exceeds a separation threshold. This separation distance threshold may be predetermined based on experimentation or user settings and reflective of the distance at which some enhancement or change in intensity of the lighting sources will enhance visibility by the operator.

In response to determining that the distance between the UAV and the operator exceeds the separation threshold (i.e., determination block 616="Yes"), the processor may increase the brightness or intensity level of (or otherwise adjust) one or more light sources of the UAV lighting system in block 618. The processor may adjust the brightness or light intensity based upon the amount by which the separation distance exceeds the separation threshold. In other words, the greater the separation distance, the more the processor may increase the intensity of the light sources. In some embodiments, the processor may increase the number of light sources that are illuminated or change an illumination pattern (e.g., beginning to flash or ceasing flashing) as the separation distance increases.

In block 620, the processor may and the orientation of the UAV with respect to the operator and adjust the lighting system settings based upon the determined orientation in order to ensure light sources can be seen by the operator. This determination may be made by the processor by obtaining compass heading information from the avionics system (e.g., 265), knowing the location of the operator (e.g., received from the operator's control unit), and based upon information stored in memory of the UAV regarding the directional visibility of each light source and the type of indications that should be illuminated to inform the operator. Thus, in block 620, the processor may select for illumination those light sources on the side of the UAV facing the operator, and may turn off light sources that are not visible to the operator in order to conserve battery power.

In determination block 622, the processor may also consider whether the UAV is operating within a regulated airspace in which particular lighting patterns and intensity are required by a regulatory authority, such as the U.S. Federal Aviation Administration (FAA). This determination may be made based upon geographic coordinates obtained from a GNSS receiver and a data table of regulated air spaces stored in memory of the UAV.

In response to determining that the UAV is within a regulated airspace requiring a particular illumination pattern and visibility (i.e., determination block 622="Yes"), the processor may determine whether the current lighting system settings meet the required illumination pattern and visibility in determination block 624. This determination may take into account the same considerations regarding ambient conditions (e.g., day or night) as in determination block 606 and light diffusing environment as in determination block 610, although subject to different decision criteria or thresholds.

In response to determining that the lighting system settings do not meet the required patterns and visibility (i.e., determination block 624="No"), the processor may adjust the lighting system settings accordingly in order to meet the regulatory requirements in block 626. In doing so, the processor may select particular light sources for illumination, adjust the colors submitted by the selected light sources, adjust the flashing rates of the selected light sources, and adjust the brightness or intensity of the selected light sources in order to meet the minimum regulatory requirements in the particular airspace.

The processor may continue to perform the operations of the method 600 in a continuous or periodic loop in order to adjust for changing conditions and operating zones. Thus, in response to determining that the UAV is not flying within a regulated airspace (i.e., determination block 622="No"), or in response to determining that the light settings meet regulatory requirements (i.e., determination block 624="Yes"), or after adjusting lighting systems settings to meet regulatory requirements in block 626, the processor may again retrieve or obtain information regarding the environment around the drone and the location of the drone in block 510.

The operations in the method 600 may be performed in any order and/or approximately simultaneously. Further, some of the operations in the method 600 that may change rapidly may be performed more frequently (e.g., determining the distance and orientation to the operator and adjusting light sources accordingly in blocks 614 through 620) in a loop, while other operations that are not expected to change rapidly are performed less frequently (e.g., determining ambient light levels and adjusting light sources accordingly in blocks 602 through 608). Further, some operations may only be performed once in a given mission when the determinations are not likely to change (e.g., determining whether the UAV is operating in a regulated airspace and adjusting lighting settings accordingly in blocks 622 through 626).

The various embodiments illustrated and described are provided merely as examples to illustrate various features of the claims. However, features shown and described with respect to any given embodiment are not necessarily limited to the associated embodiment and may be used or combined with other embodiments that are shown and described. Descriptions of various embodiments in terms of an adjusting UAV lighting system are provided merely as examples. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of adjusting a lighting system of an unmanned autonomous vehicle (UAV) to maintain visibility, comprising:
    obtaining, by a processor in the UAV, information identifying an environmental condition around the UAV;
    using, by the processor, the obtained information to determine a visibility impairment factor that identifies an impact of the identified environmental condition on the visibility of a light source on the UAV; and
    adjusting, by the processor, the light source based on the determined visibility impairment factor that identifies the impact of the identified environmental condition on the visibility of the light source.

2. The method of claim 1, wherein obtaining information regarding the environmental condition around the UAV comprises obtaining information from sensors on the UAV.

3. The method of claim 2, wherein obtaining information from sensors on the UAV comprises obtaining information from at least one of a UAV camera, a global navigation satellite system (GNSS), an ambient light sensor, an altimeter, avionics, a barometer, a thermometer, a magnetometer, a microphone, an accelerometer, a gyroscope, humidity sensor, or a communication system.

4. The method of claim 1, further comprising obtaining a location of the UAV, wherein adjusting the light source based on the determined visibility impairment factor that identifies the impact of the identified environmental condition on the visibility of the light source comprises adjusting the light source based on the determined impact of the identified environmental condition on the visibility of the light source and the location of the UAV.

5. The method of claim 1, further comprising determining a separation distance between the UAV and an operator, wherein adjusting the light source based on the determined visibility impairment factor that identifies the impact of the identified environmental condition on the visibility of the light source comprises adjusting the light source based on the determined visibility impairment factor that identifies the impact of the identified environmental condition on the visibility of the light source and the determined separation distance between the UAV and the operator.

6. The method of claim 1, further comprising determining whether the UAV is within airspace for which a regulatory lighting requirement applies, wherein adjusting the light source based on the determined visibility impairment factor that identifies the impact of the identified environmental condition on the visibility of the light source further comprises adjusting the lighting system of the UAV to comply with the regulatory lighting requirement in response to determining that the UAV is within airspace for which the regulatory lighting requirement applies.

7. The method of claim 1, further comprising determining a current time or date information, wherein adjusting the light source based on the determined visibility impairment factor that identifies the impact of the identified environmental condition on the visibility of the light source comprises adjusting the light source based on the determined visibility impairment factor that identifies the impact of the identified environmental condition on the visibility of the light source and the current time or date information.

8. The method of claim 1, further comprising:
determining whether the UAV is indoors; and
determining whether the UAV is operating during daylight hours; and
wherein adjusting the light source based on the determined visibility impairment factor that identifies the impact of the identified environmental condition on the visibility of the light source comprises adjusting the light source based on at least one of the determination of whether the UAV is indoors or the determination of whether the UAV operating during daylight hours.

9. The method of claim 8, wherein adjusting the light source based on at least one of the determination of whether the UAV is indoors or the determination of whether the UAV operating during daylight hours comprises:
increasing a brightness of the light source in response to determining that the UAV is not indoors and operating during daylight hours.

10. The method of claim 8, wherein adjusting the light source based on at least one of the determination of whether the UAV is indoors or the determination of whether the UAV operating during daylight hours comprises:
decreasing a brightness of the light source in response to determining that the UAV is indoors regardless of whether the UAV is operating during daylight hours.

11. The method of claim 1, further comprising:
determining an orientation of the UAV with respect to an operator,
wherein adjusting the light source based on the determined visibility impairment factor that identifies the impact of the identified environmental condition on the visibility of the light source comprises adjusting the light source based on the determined visibility impairment factor that identifies the impact of the identified environmental condition on the visibility of the light source and the determined orientation of the UAV with respect to the operator.

12. The method of claim 11, adjusting the light source based on the determined visibility impairment factor that identifies the impact of the identified environmental condition on the visibility of the light source and the determined orientation of the UAV with respect to the operator comprises illuminating one or more light sources facing the operator.

13. The method of claim 11, adjusting the light source based on the determined visibility impairment factor that identifies the impact of the identified environmental condition on the visibility of the light source and the determined orientation of the UAV with respect to the operator comprises turning off one or more light sources facing away from the operator.

14. The method of claim 1, wherein adjusting the light source based on the determined visibility impairment factor that identifies the impact of the identified environmental condition on the visibility of the light source comprises adjusting at least one or more of intensity of light, light color, light pattern, or light flashing frequency of the light source.

15. The method of claim 1, wherein the light source is configured to provide status information relating to the UAV.

16. A lighting system for an unmanned autonomous vehicle (UAV), comprising:
a light source; and
a processor coupled to the light source and configured with processor-executable instructions to:
obtain information identifying an environmental condition around the UAV;
use the obtained information to determine a visibility impairment factor that identifies an impact of the identified environmental condition on a visibility of the light source; and
adjust the light source based on the determined visibility impairment factor that identifies the impact of the identified environmental condition on the visibility of the light source.

17. The lighting system of claim 16, wherein the processor is further configured with processor-executable instructions to obtain information identifying the environmental condition around the UAV by obtaining information from sensors on the UAV.

18. The lighting system of claim 17, wherein the processor is further configured with processor-executable instructions to obtain information from sensors on the UAV by obtaining information from at least one of a UAV camera, a global navigation satellite system (GNSS), an ambient light sensor, an altimeter, avionics, a barometer, a thermometer, a magnetometer, a microphone, an accelerometer, a gyroscope, humidity sensor, or a communication system.

19. The lighting system of claim 16, wherein the processor is further configured with processor-executable instructions to:
obtain a location of the UAV; and
adjust the light source based on the determined visibility impairment factor that identifies the impact of the identified environmental condition on the visibility of the light source based on the location of the UAV.

20. The lighting system of claim 16, wherein the processor is further configured with processor-executable instructions to:
determine a separation distance between the UAV and an operator; and
adjust the light source based on the determined visibility impairment factor that identifies the impact of the identified environmental condition on the visibility of the light source by adjusting the light source based on the determined visibility impairment factor that identifies the impact of the identified environmental condition on the visibility of the light source and the determined separation distance between the UAV and the operator.

21. The lighting system of claim 16, wherein the processor is further configured with processor-executable instructions to:
determine whether the UAV is within airspace for which a regulatory lighting requirement applies; and
adjust the lighting system of the UAV based on the determined visibility impairment factor that identifies the impact of the identified environmental condition on the visibility of the light source by adjusting the light source based on the determined visibility impairment factor that identifies the impact of the identified environmental condition on the visibility of the light source and to comply with the regulatory lighting requirement in response to determining that the UAV is within airspace for which the regulatory lighting requirement applies.

22. The lighting system of claim 16, wherein the processor is further configured with processor-executable instructions to:
   determine a current time or date information; and
   adjust the light source based on the determined visibility impairment factor that identifies the impact of the identified environmental condition on the visibility of the light source by adjusting the light source based on the determined visibility impairment factor that identifies the impact of the identified environmental condition on the visibility of the light source and the current time or date information.

23. The lighting system of claim 16, wherein the processor is further configured with processor-executable instructions to:
   determine whether the UAV is indoors; and
   determine whether the UAV is operating during daylight hours; and
   adjust the light source based on the determined visibility impairment factor that identifies the impact of the identified environmental condition on the visibility of the light source by adjusting the light source based on at least one of the determination of whether the UAV is indoors or the determination of whether the UAV operating during daylight hours.

24. The lighting system of claim 23, wherein the processor is configured with processor-executable instructions to adjust the light source based on at least one of the determination of whether the UAV is indoors or the determination of whether the UAV operating during daylight hours by:
   increasing brightness of the light source in response to determining that the UAV is not indoors and operating during daylight hours.

25. The lighting system of claim 23, wherein the processor is further configured with processor-executable instructions to adjust the light source based on at least one of the determination of whether the UAV is indoors or the determination of whether the UAV operating during daylight hours by:
   decreasing brightness of the light source in response to determining that the UAV is indoors regardless of whether the UAV is operating during daylight hours.

26. The lighting system of claim 16, wherein the processor is further configured with processor-executable instructions to:
   determine an orientation of the UAV with respect to an operator; and
   adjust the light source based on the determined visibility impairment factor that identifies the impact of the identified environmental condition on the visibility of the light source by adjusting the light source based on the determined visibility impairment factor that identifies the impact of the identified environmental condition on the visibility of the light source and the determined orientation of the UAV with respect to the operator.

27. The lighting system of claim 26, wherein the processor is further configured with processor-executable instructions to adjust the light source based on the determined visibility impairment factor that identifies the impact of the identified environmental condition on the visibility of the light source and the determined orientation of the UAV with respect to the operator by illuminating one or more light sources facing the operator.

28. The lighting system of claim 26, wherein the processor is further configured with processor-executable instructions to adjust the light source based on the determined visibility impairment factor that identifies the impact of the identified environmental condition on the visibility of the light source and the determined orientation of the UAV with respect to the operator by turning off one or more light sources facing away from the operator.

29. The lighting system of claim 16, wherein the processor is further configured with processor-executable instructions to adjust the light source based on the determined visibility impairment factor that identifies the impact of the identified environmental condition on the visibility of the light source by adjusting at least one or more of intensity of light, light color, light pattern, or light flashing frequency.

30. The lighting system of claim 16, wherein the light source is configured to provide status information relating to the UAV.

* * * * *